United States Patent Office 3,197,687
Patented July 27, 1965

3,197,687
AUTOMATIC BRAKING DEVICE FOR DIRECT CURRENT MOTORS
Benjamin Vaucher, Tramelan, Switzerland, assignor to Kummer Freres S.A. Fabrique de Machines, Tramelan, Switzerland, a joint-stock company
Filed Nov. 13, 1961, Ser. No. 151,829
Claims priority, application Switzerland, Nov. 15, 1960, 12,783/60
9 Claims. (Cl. 318—270)

This invention relates to the automatic braking devices for direct current motors.

The speed of a direct current shunt motor depends on the voltage applied to the armature of the motor. If said voltage is produced by a metal rectifier, the motor speed can be increased from a low to a high value merely by increasing the voltage applied to the armature of the motor. Decreasing the voltage produced by the metal rectifier does however not cause an immediate speed reduction of the motor from the high to the low value. In such a case the speed reduction of the motor is only caused by the bearing friction, the air friction of the rotor and the like. If the motor speed is to be reduced rapidly, a braking resistor must be connected in parallel with the armature of the motor.

Direct current shunt motors with such a braking resistor has as yet only been used on commercial scale in the cases in which the motor had to be stopped immediately.

It is therefore an object of the invention to provide an automatic braking device for direct current motors, which will operate from the moment at which the voltage applied to the armature of the motor is reduced to a low value, and until the motor speed corresponds to said low value of the voltage applied to its armature.

Still further objects of the invention will become apparent in the course of the following description.

One embodiment of the automatic braking device according to the invention has been represented diagrammatically and by way of example in the accompanying drawings.

Figure 1:
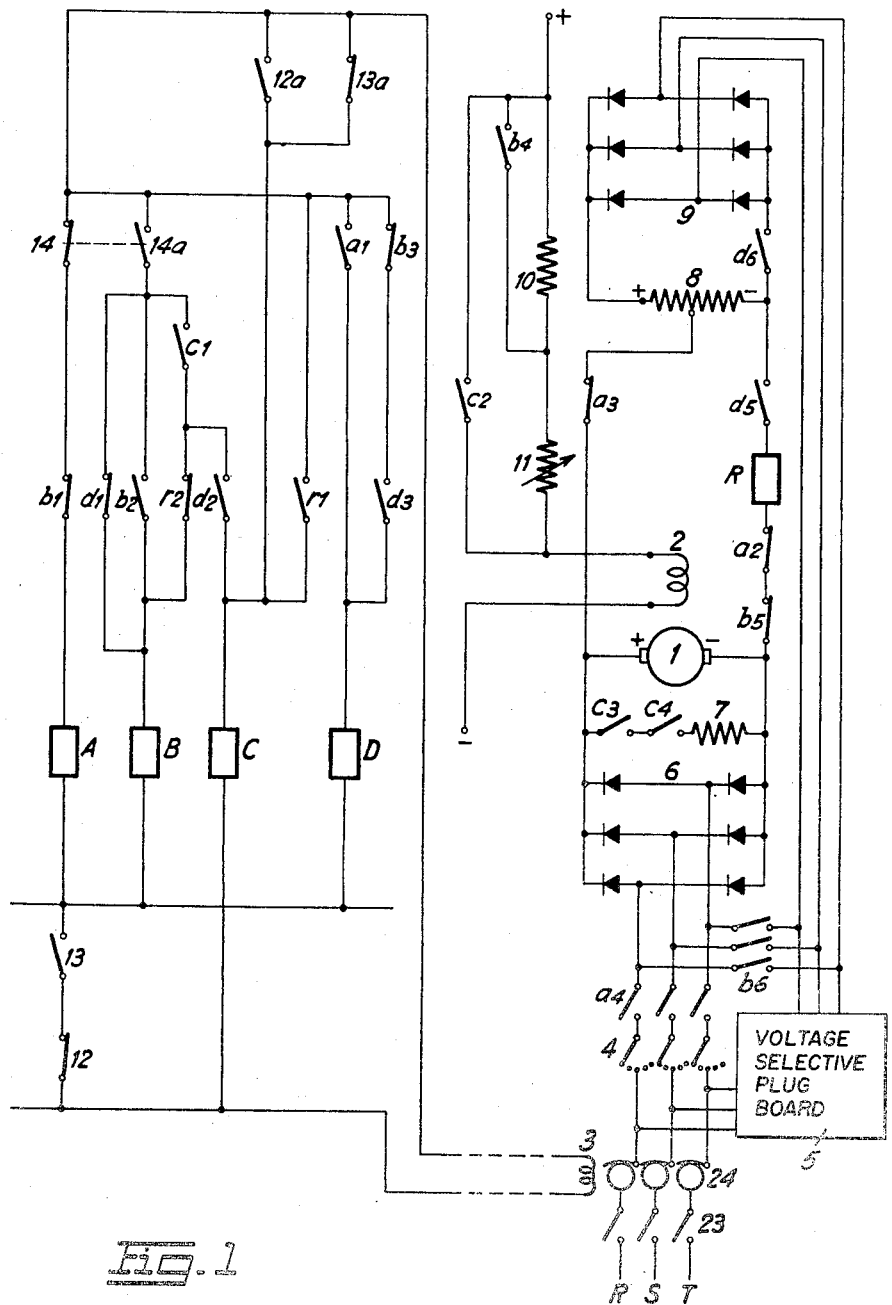
FIG. 1 shows the circuit diagram of that embodiment.

In the diagram of FIG. 1 the different parts belonging to the same relay are designated by the same letter, a capital for the coil and the corresponding small letter with a numeral for the contacts operated by said coil. Moreover, the different parts of the circuit of FIG. 1 are represented in their positions of rest, when no current flows through the circuit.

The voltage supplied to the armature 1 of the direct current motor is produced by a selenium rectifier 6 supplied itself from a three-phase circuit through lines R, S, T, a circuit-breaker 23, an autotransformer 24, a switch 4 and the contacts $a_4$ which are closed upon energization of a coil A supplied by a control voltage of 60 v. A braking resistor 7 and, in series therewith, two contacts $c_3$, $c_4$, which are closed upon energization of a coil C, are connected in parallel to the armature 1. A variable resistor 11 for adjusting the motor speed and a calibration resistor 10 in series with resistor 11 are mounted in the circuit of the energizing coil. The resistor 10 can be short-circuited by a contact $b_4$, which can be actuated by a coil B, and both resistors 10 and 11 can be short-circuited at once by a contact $c_2$, which is closed upon energization of coil C. A calibration resistor 8 is connected to the armature 1 through a relay R and contacts controlled by coils A, B, D. A voltage is set at resistor 8 by means of a rectifier 9. The latter is connected to the autotransformer 24 through a plug table 5 which rectifier 6 is also connected to through contacts $b_6$ actuated by coil B.

The control circuits represented on the left side of FIG. 1 substantially comprise the coils A, B, C, D of four relays, which can be energized by a voltage of 60 v., the corresponding contacts $a$, $b$, $c$, $d$ and the contacts $r_1$ and $r_2$ of relay R. The function of relays A, B, C, D, R is described hereinafter. A switch comprising two coupled contacts 14, 14a, as well as two supplementary switches each comprising two coupled contacts 12, 12a and 13, 13a, respectively, are still provided in the control circuits. The 60 v. voltage supplying these control circuits is produced by a coil 3 of the autotransformer 2.

The braking device described operates as follows:

The voltages supplied to the motor to drive it at the desired low and high speeds, respectively, and the energizing voltage are first adjusted. The motor starting switch 13 and the circuit-breaker 23 are then closed. The coil A of the high speed relay is thereby energized by the 60 v. voltage provided that the speed adjusting switch 14, 14a be on the position corresponding to the high speed in which contact 14 is closed as shown in FIG. 1. The energized coil A closes contact $a_1$ thereby energizing coil D, which is provided for enabling the automatic braking device described to operate only if the motor speed is changed from high to low. In other words the braking device cannot operate either when the motor speed is changed from low to high or when the motor is started at low speed, because relay D will not be energized and contacts $d_5$ and $d_6$ will accordingly be open. Coil D remains energized until contact $b_3$ is opened upon energization of coil B of the low speed relay. The motor thus rotates at high speed until switch 14, 14a is moved to its other position, in which contact 14 is open and contact 14a closed. At that moment, the control current of the high speed relay through coil A is interrupted. The contacts $a_2$ and $a_3$ of this high speed relay are thus closed so that the relay R is now energized. The direct current thereby flowing through the coil of relay R is opposed to the direct current supplied to resistor 8 by rectifier 9.

The rectifier 9 is supplied by the voltage which has been selected at the plug table 5 and which corresponds to the motor low speed. The direct current voltage supplied by rectifier 9 is therefore lower than the high speed voltage supplied by rectifier 6. In the circuit comprising relay R a current thus flows from the positive pole of armature 1 through contact $a_3$, resistor 8, contact $d_5$, coil of relay R and the two contacts $a_2$ and $b_5$ back to the negative pole of the armature 1.

The energized relay R causes the closure of contact $r_1$, thus energizing the coil C of the braking relay and accordingly closing the two main contacts $c_3$ and $c_4$ of this relay. A braking current will thus flow through resistor 7. The motor speed decreases so that the voltage at the terminals of the armature 1 also drops. As soon as the voltage at the armature terminals will be equal to the voltage at the terminals of resistor 8, the relay R will no more be energized and the contact $r_2$ will be closed again.

This contact $r_2$ energizes the low speed relay and current flows through its coil B, contact $r_2$ and contact $c_1$, which is still closed by the energized coil C. Contact $b_2$ of the guard circuit of coil B will thus be closed. The energized low speed relay also causes the closure of the three main contacts $b_6$, thereby supplying rectifier 6 with the low speed voltage. Moreover, contact $b_3$ will be opened thereby interrupting the current though coil D of the preselection relay. The latter therefore opens contact $d_2$ thus interrupting the current energizing the braking relay C.

The armature 1 is now supplied with the low speed voltage and the rotor of the motor rotates at the predetermined low speed.

Contact $b_1$ is a safety contact which opens the circuit of coil A of the high speed relay as soon as the low speed relay is energized. Contact $d_1$ permits starting the motor at low speed.

It should be observed that the motor, to which the braking device described is associated, is not a shunt motor, since the voltage applied to its field comes from a separate source. However, as far as braking is concerned, this motor operates like a shunt motor. Its power/speed characteristic is also similar to that of a shunt motor.

This direct current motor with a field circuit independent from that of the armature can also be constructed so as to develop substantially a constant couple at lower speeds and substantially a constant power at higher speeds. In this case it would be advisable to brake the motor, for reducing its speed rapidly, by increasing the voltage applied to its field. The diagram of FIG. 1 also permits to follow the switching operations occurring in the field circuit in braking.

It has already been said hereabove that a calibration resistor 10 and a rheostat 11 are connected in series in the circuit of the motor field 2. When the voltage applied to the motor corresponds to the low speed, the contact $b_4$ short-circuits resistor 10 thus not permitting the motor of rotating at high speed. The motor field is only reduced by rheostat 11. During the braking operation the contact $c_2$ short-circuits resistor 10 and rheostat 11 thus permitting the braking device of operating satisfactorily in every case in which an adjustment of the motor speed is desired.

The contact $12a$ has been provided in order to permit an immediate and strong braking of the motor. Upon closing contact $12a$, the braking relay C is immediately energized thus producing the closure of contacts $c_3$ and $c_4$. To ascertain that the braking device will not be forgotten in operative condition the contact $13a$ is coupled to switch 13 so as to open when the latter is closed.

Figure 2:
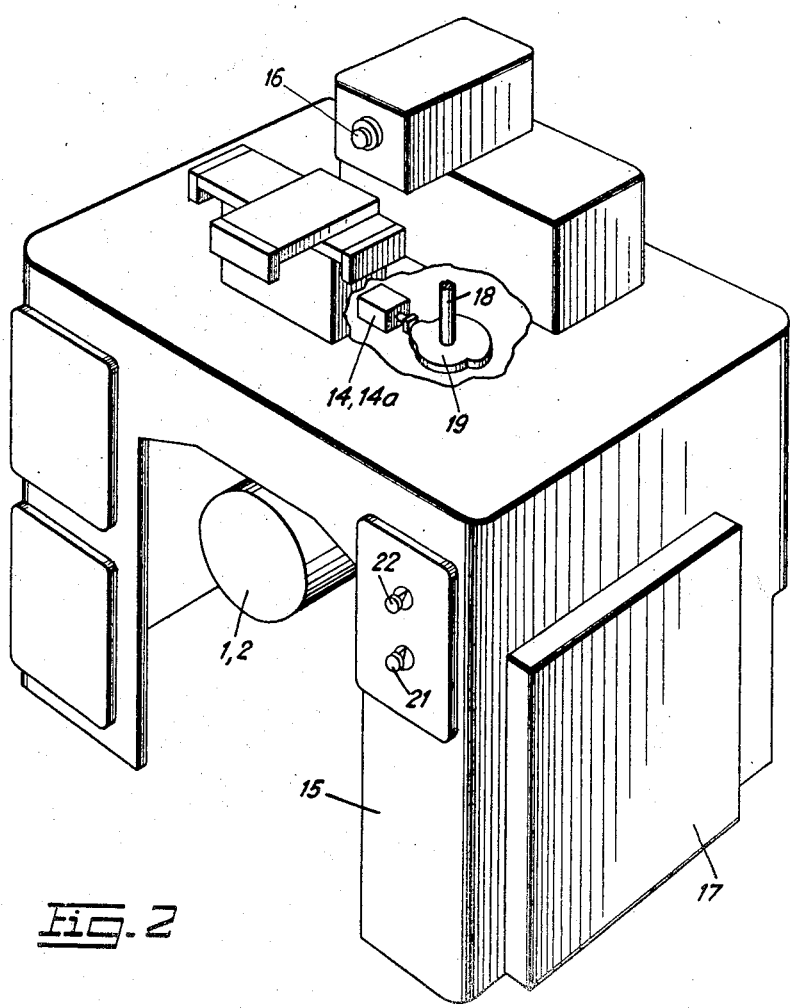
FIG. 2 is a perspective view of a lathe driven by a direct current motor provided with said embodiment of the braking device according to the invention.

FIG. 2 shown a spindle 16 of an automatic lathe 15, which is driven by a direct current motor 1, 2 provided with an automatic braking device according to the invention and corresponding to the diagram of FIG 1. A cam 19 controls switch 14, $14a$. The camshaft 18 is driven by the spindle 16 through an appropriate mechanical speed reducer (not shown). When the spindle 16 is rotating, the camshaft 18 also rotates. The switch 14, $14a$ will be either in low or high speed position, according to the position of cam 19 around shaft 18. The different electrical parts of the braking device according to the invention are located within a casing 17. A control board 20 comprises two control buttons 21 and 22. Button 21 permits adjusting the voltage applied to the motor, while button 22 permits adjusting the rheostat 11.

While I have described one embodiment of the automatic braking device according to my invention, it should be understood that various changes will appear obvious to those skilled in the art without departing from the spirit of the invention or sacrificing the advantages thereof.

I claim:

1. An automatic braking device for a direct current motor comprising, in combination, high speed relay means adapted for applying a first predetermined voltage to the motor thereby causing the latter to rotate at a predetermined high speed, low speed relay means adapted for applying a second adjustable voltage to the motor thereby causing the latter to rotate at a speed lower than said predetermined high speed, control switching means having a first position corresponding to said high motor speed and a second position corresponding to said lower motor speed, a braking resistor, contact means adapted to connect said braking resistor to the motor, relay means controlled by said high speed relay means and adapted to control said contact means for connecting said braking resistor to the motor, and a braking control circuit including a calibration resistor having a voltage lower than said first voltage applied at its terminals, said braking control circuit deenergizing said relay means when the voltage applied across the motor has decreased in braking so as to be equal to the voltage applied to said calibration resistor and said relay means thereby causing said second adjustable voltage to be applied to the motor.

2. The combination of claim 1, further comprising a rectifier producing said first and said second voltages applied to the motor.

3. The combination of claim 1, further comprising braking relay means controlled by said relay means.

4. The combination of claim 1, further comprising preselection relay means controlled by said high speed relay means.

5. The combination of claim 1, further comprising a rectifier producing the voltage applied to said calibration resistor.

6. The combination of claim 1, further comprising camming means operating said control switching means.

7. An automatic braking device for a direct current motor comprising, in combination, high speed relay means adapted for applying a first predetermined voltage to the motor thereby causing the latter to rotate at a predetermined high speed, low speed relay means adapted for applying a second voltage to the motor thereby causing the latter to rotate at a speed lower than said predetermined high speed, voltage adjusting means disposed between said first and second voltages, control switching means having a first position corresponding to said high motor speed and a second position corresponding to said lower motor speed, a braking resistor, contact means adapted to connect said braking resistor to said motor, relay means controlled by said high speed relay means and adapted to control said contact means for connecting said braking resistor to said motor, and a braking control circuit including a calibration resistor having a voltage lower than said first voltage applied at its terminals, said braking control circuit deenergizing said relay means when the voltage applied across the motor has decreased in braking so as to be equal to the voltage applied to said calibration resistor and said relay means thereby causing said second voltage to be applied to the motor.

8. An automatic braking device according to claim 7 wherein said voltage adjusting means includes a plug table.

9. An automatic braking device according to claim 7 wherein said motor includes a motor field, control means therefor, and contact means disposed in said control means which are controlled by the low speed relay means and the braking control circuit respectively.

References Cited by the Examiner
UNITED STATES PATENTS 2,190,523 2/40 Rogers et al. _____ 318—368
2,855,553 10/58 Morgan _____ 318—270

ORIS L. RADER, *Primary Examiner.*

JOHN F. COUCH, *Examiner.*